US009079443B2

(12) United States Patent
Pudleiner et al.

(10) Patent No.: US 9,079,443 B2
(45) Date of Patent: Jul. 14, 2015

(54) ID CARDS WITH BLOCKED LASER ENGRAVING WRITABILITY

(75) Inventors: Heinz Pudleiner, Krefeld (DE); Mehmet-Cengiz Yesildag, Leverkusen (DE); Georgios Tziovaras, Wuppertal (DE); Dirk Pophusen, Bergisch Gladbach (DE)

(73) Assignee: Bayer MaterialScience AG, Leverkusen (DE)

( * ) Notice: Subject to any disclaimer, the term of this patent is extended or adjusted under 35 U.S.C. 154(b) by 204 days.

(21) Appl. No.: 13/125,886

(22) PCT Filed: Oct. 10, 2009

(86) PCT No.: PCT/EP2009/007269

§ 371 (c)(1),
(2), (4) Date: Apr. 25, 2011

(87) PCT Pub. No.: WO2010/046042

PCT Pub. Date: Apr. 29, 2010

(65) Prior Publication Data

US 2011/0200801 A1 Aug. 18, 2011

(30) Foreign Application Priority Data

Oct. 23, 2008 (EP) .................................... 08018547

(51) Int. Cl.

| | |
|---|---|
| ***B41M 5/24*** | (2006.01) |
| ***B32B 37/00*** | (2006.01) |
| ***B32B 38/10*** | (2006.01) |
| ***B41M 7/00*** | (2006.01) |

(52) U.S. Cl.

CPC ............... *B41M 5/24* (2013.01); *B41M 7/0027* (2013.01); *Y10T 428/24802* (2015.01)

(58) Field of Classification Search

None

See application file for complete search history.

(56) References Cited

U.S. PATENT DOCUMENTS

| | | | | |
|---|---|---|---|---|
| 3,610,729 | A | 10/1971 | Rogers | |
| 3,692,744 | A | 9/1972 | Rich et al. | |
| 3,711,176 | A | 1/1973 | Alfrey, Jr. et al. | |
| 4,176,224 | A | 11/1979 | Bier et al. | |
| 4,446,305 | A | 5/1984 | Rogers et al. | |
| 4,540,623 | A | 9/1985 | Im et al. | |
| 4,606,859 | A * | 8/1986 | Duggan et al. | 540/122 |
| 4,803,114 | A | 2/1989 | Schledorn | |
| 4,982,014 | A | 1/1991 | Freitag et al. | |
| 5,126,428 | A | 6/1992 | Freitag et al. | |
| 5,225,314 | A * | 7/1993 | Waterman et al. | 430/253 |
| 5,227,458 | A | 7/1993 | Freitag et al. | |
| RE34,605 | E * | 5/1994 | Schrenk et al. | 359/359 |
| 5,448,404 | A | 9/1995 | Schrenk et al. | |
| 5,882,774 | A | 3/1999 | Jonza et al. | |
| 5,928,780 | A | 7/1999 | Schmidt et al. | |
| 5,944,356 | A | 8/1999 | Bergmann et al. | |
| 6,179,338 | B1 | 1/2001 | Bergmann et al. | |
| 6,531,230 | B1 | 3/2003 | Weber et al. | |
| 6,693,657 | B2 | 2/2004 | Carroll, Jr. et al. | |
| 6,780,515 | B2 * | 8/2004 | Dobler | 428/432 |
| 6,783,349 | B2 | 8/2004 | Neavin et al. | |
| 2003/0012902 | A1 * | 1/2003 | Kim et al. | 428/35.7 |
| 2004/0198858 | A1 | 10/2004 | Labrec | |
| 2005/0259326 | A1 | 11/2005 | Weber et al. | |
| 2007/0295689 | A1 | 12/2007 | Clauss et al. | |
| 2009/0123757 | A1 | 5/2009 | Pudleiner et al. | |
| 2010/0108874 | A1 | 5/2010 | Zahedi | |

FOREIGN PATENT DOCUMENTS

| | | | |
|---|---|---|---|
| DE | 1900270 | A1 | 11/1969 |
| DE | 2407674 | A1 | 10/1974 |
| DE | 1966931 | A1 | 5/1975 |
| DE | 2715932 | A1 | 10/1978 |
| DE | 3832396 | A1 | 2/1990 |
| DE | 19522397 | A1 | 1/1997 |
| DE | 102007024298 | B3 | 10/2008 |
| DE | 102007054046 | A1 | 6/2009 |
| EP | 0232502 | A2 | 8/1987 |
| EP | 0359953 | A1 | 3/1990 |
| FR | 1561518 | A | 3/1969 |
| GB | 1229482 | A | 4/1971 |
| GB | 1464449 | A | 2/1977 |
| NL | 7802830 | A | 9/1979 |
| WO | WO-94/15319 | A1 | 7/1994 |
| WO | WO-99/39224 | A1 | 8/1999 |
| WO | WO-03/055638 | A1 | 7/2003 |
| WO | WO-03/100521 | A1 | 12/2003 |
| WO | WO-2004/050766 | A1 | 6/2004 |
| WO | WO-2004/050767 | A1 | 6/2004 |
| WO | WO-2006/042714 | A1 | 4/2006 |

OTHER PUBLICATIONS

Translation of NL-7802830-A.

Translation of "Handbuch der Chipkarten", Ranki/Effing, 5. Auflage, Aug. 7, 2008, Hanser Verlag, p. 42 ff.

* cited by examiner

*Primary Examiner* — Mark Ruthkosky
*Assistant Examiner* — Laura C Powers
(74) *Attorney, Agent, or Firm* — Drinker Biddle & Reath LLP

(57) ABSTRACT

The invention relates to layer structures for ID cards on which information can be written by laser engraving and which have an additional layer that is applied to the card body after the laser engraving and restricts or completely prevents subsequent writing on the card by means of laser engraving, and consequently prevents falsification of the identifying information contained, and relates to a method for blocking the laser engraving writability of layer structures on which information can be written by laser engraving.

15 Claims, No Drawings

ID CARDS WITH BLOCKED LASER ENGRAVING WRITABILITY

PRIORITY

Priority is claimed as a national stage application, under 35 U.S.C. §371, to PCT/EP2009/007269, filed Oct. 10, 2009, which claims priority to European application 08018547.3, filed Oct. 23, 2008. The disclosures of the aforementioned priority applications are incorporated herein by reference in their entirety.

The present invention provides laminar structures for ID cards that can be written by laser engraving having an additional layer which is applied on to the body of the card after laser engraving and limits or completely prevents the subsequent writing of the card by laser engraving and thus falsification of the identification information contained, as well as a method of blocking the laser engraving writability of laminar structures marked by laser engraving.

The writing of plastics films by laser engraving is an important step in the production of film composites. These film composites play an important part e.g. for identification documents such as passports, identity documents, ID cards or credit cards. The personalising of cards in black and white by laser engraving, i.e. the applying of lettering or pictures such as black and white photographs, is generally known. Personalisation by laser engraving is generally distinguished in particular by its high anti-forgery security. The image is formed in the interior of the card, so that it is impossible to remove the image and produce a new image. Separating the cards into their individual layers in order to gain access to the laser layer is impossible in cards made entirely of polycarbonate.

Plastic cards are typically produced by lamination of a number of films. In order to be able to carry out the personalisation of the card by laser engraving, films provided with laser-sensitive additives are laminated across the entire surface into the external layers of the multi-layer card structure.

After the bodies of the cards have been laminated, the personal data in the form of textual information and/or image information is lasered, i.e. engraved, into the card. Following this, however, the film layer loaded with laser additives remains active and can still be subsequently provided with additional data and thus be modified in terms of content. This possibility opens up the potential for subsequent forgery of identification documents—referred to hereinafter as ID documents—by adding data and image information.

The need therefore existed to block the subsequent provision of these multi-layer film composites with information by means of laser engraving, or at least to restrict it severely and thus to increase the anti-forgery security of security documents, preferably ID documents.

The object on which the present invention was based therefore consisted in finding multi-layer film composites in which subsequent laser engraving writability is severely reduced or completely blocked.

This object was achieved according to the invention in that a laminar structure marked by laser-engraving is provided, after being marked by means of laser engraving, with at least one outer layer, over the whole or part of the surface, which reflects or absorbs IR radiation.

In US 2005/0259326A1, the use of multi-layer optical films which reflect IR light in cards is described. The IR-reflective layers are arranged within the film composite, i.e. between at least two other polymer layers in the card, to permit card recognition by means of reflection of IR radiation. These are so-called VLT (visible light transmissive) cards. No use of IR-reflective films as outer layers to block laser engraving writability is described in this application.

The present invention therefore provides a laminar structure marked by laser engraving, containing at least one thermoplastic polymer layer equipped to be markable by laser engraving and an outer layer over the whole or part of the surface, which reflects or absorbs IR radiation.

The marking of plastics films by laser engraving is referred to for short in specialist circles and also hereinafter as laser marking. Accordingly, the term "laser-marked" hereinafter is intended to mean marked by means of laser engraving. The process of laser engraving is known to the person skilled in the art and is not to be confused with printing by means of laser printers.

The thermoplastic polymer layer equipped to be markable by laser engraving preferably contains at least one laser-sensitive additive. The laser-sensitive additive may be suitable either for laser engraving marking of light on a dark background, dark on a light background or coloured marking. Laser-sensitive marking additives for laser engraving marking of dark on a light background are preferred.

Suitable laser-sensitive additives are, for example, so-called laser marking additives, i.e. those comprising an absorber in the wavelength range of the laser to be used, preferably in the wavelength range of ND:YAG lasers (neodymium-doped yttrium-aluminium-garnet lasers). These laser marking additives and their use in moulding compositions are described e.g. in WO-A 2004/50766 and WO-A 2004/50767 and are commercially available from DSM with the trade name Micabs®. Other absorbers that are suitable as laser-sensitive additives are carbon black, coated layer silicates as described e.g. in DE-A-195 22 397 and commercially available with the trade name Lazerflair®, antimony-doped tin oxide as described e.g. in U.S. Pat. No. 6,693,657 and commercially available with the trade name Mark-It™ and phosphorus-containing tin-copper mixed oxides as described e.g. in WO-A 2006/042714.

It is preferred if the particle size of the laser-sensitive additive is in the range of from 100 nm to 10 μm and particularly advantageous if it is in the range of from 500 nm to 2 μm.

A most particularly preferred laser-sensitive additive is carbon black.

The thermoplastic polymer in the thermoplastic polymer layer can preferably be at least one thermoplastic polymer selected from polymers of ethylenically unsaturated monomers and/or polycondensates of bifunctional reactive compounds and/or polyaddition products of bifunctional reactive compounds. For certain applications it may be advantageous, and therefore preferred, to use a transparent thermoplastic polymer.

Particularly suitable thermoplastic polymers are polycarbonates or copolycarbonates based on diphenols, poly- or copolyacrylates and poly- or copolymethacrylates such as, for example and preferably, polymethyl methacrylate (PMMA), polymers or copolymers with styrene such as, for example and preferably, polystyrene (PS) or polystyrene-acrylonitrile (SAN), thermoplastic polyurethanes, and polyolefins such as, for example and preferably, polypropylene grades or polyolefins based on cyclic olefins (e.g. TOPAS®, Hoechst), poly- or copolycondensates of terephthalic acid such as, for example and preferably, poly- or copolyethylene terephthalate (PET or CoPET), glycol-modified PET (PETG), glycol-modified poly- or copolycyclohexanedimethylene terephthalate (PCTG) or poly- or copolybutylene terephthalate (PBT or CoPBT), poly- or copolycondensates of naphthalenedicarboxylic acid such as, for example and preferably, polyethylene glycol naphthalate (PEN), poly- or copolycondensate(s) of at least one cycloalkyl dicarboxylic acid such as, for example and preferably, polycyclohexanedimethanol cyclohexanedicarboxylic acid (PCCD), polysulfones (PSU) or mixtures of the aforementioned.

Preferred thermoplastic polymers are polycarbonates or copolycarbonates or blends containing at least one polycarbonate or copolycarbonate. Particularly preferred are blends containing at least one polycarbonate or copolycarbonate and at least one poly- or copolycondensate of terephthalic acid, naphthalenedicarboxylic acid or a cycloalkyl dicarboxylic acid, preferably cyclohexanedicarboxylic acid. Most particularly preferred are polycarbonates or copolycarbonates, particularly having average molecular weights $M_w$ of from 500 to 100 000, preferably from 10 000 to 80 000, particularly preferably from 15 000 to 40 000 or blends thereof with at least one poly- or copolycondensate of terephthalic acid having average molecular weights $M_w$ of from 10 000 to 200 000, preferably from 26 000 to 120 000.

Suitable as poly- or copolycondensates of terephthalic acid in preferred embodiments of the invention are polyalkylene terephthalates. Suitable polyalkylene terephthalates are e.g. reaction products of aromatic dicarboxylic acids or their reactive derivatives (e.g. dimethyl esters or anhydrides) and aliphatic, cycloaliphatic or araliphatic diols and mixtures of these reaction products.

Preferred polyalkylene terephthalates can be produced from terephthalic acid (or its reactive derivatives) and aliphatic or cycloaliphatic diols with 2 to 10 C atoms by known methods (Kunststoff-Handbuch, vol. VIII, p. 695 ff., Karl-Hanser-Verlag, Munich, 1973).

Preferred polyalkylene terephthalates contain at least 80 mole %, preferably 90 mole %, terephthalic acid groups, based on the dicarboxylic acid component, and at least 80 mole %, preferably at least 90 mole % ethylene glycol and/or 1,4-butanediol and/or 1,4-cyclohexanedimethanol groups, based on the diol component.

The preferred polyalkylene terephthalates may contain, in addition to terephthalic acid groups, up to 20 mole % of groups of other aromatic dicarboxylic acids with 8 to 14 C atoms or aliphatic dicarboxylic acids with 4 to 12 C atoms, such as e.g. groups of phthalic acid, isophthalic acid, 2,6-naphthalenedicarboxylic acid, 4,4'-diphenyldicarboxylic acid, succinic acid, adipic acid, sebacic acid, azelaic acid and cyclohexanediacetic acid.

The preferred polyalkylene terephthalates may contain, in addition to ethylene or 1,4-butanediol glycol groups, up to 80 mole % of other aliphatic diols with 3 to 12 C atoms or cycloaliphatic diols with 6 to 21 C atoms, e.g. groups of 1,3-propanediol, 2-ethyl-1,3-propanediol, neopentyl glycol, 1,5-pentanediol, 1,6-hexanediol, 1,4-cyclohexanedimethanol, 3-methyl-2,4-pentanediol, 2-methyl-2,4-pentanediol, 2,2,4-trimethyl-1,3-pentanediol and 2-ethyl-1,6-hexanediol, 2,2-diethyl-1,3-propanediol, 2,5-hexanediol, 1,4-di-([beta]-hydroxyethoxy)benzene, 2,2-bis(4-hydroxycyclohexyl)-propane, 2,4-dihydroxy-1,1,3,3-tetramethylcyclobutane, 2,2-bis (3-[beta]-hydroxy-ethoxyphenyl)propane and 2,2-bis(4-hydroxypropoxyphenyl)propane (cf. DE-OS 24 07 674, 24 07 776, 2 15 932).

The polyalkylene terephthalates can be branched by incorporating relatively small amounts of 3- or 4-hydric alcohols or 3- or 4-basic carboxylic acids, as described e.g. in DE-OS 19 00 270 and U.S. Pat. No. 3,692,744. Examples of preferred branching agents are trimesic acid, trimellitic acid, trimethylolethane, trimethylolpropane and pentaerythritol.

Preferably, no more than 1 mole % of the branching agent is used, based on the acid component.

Particularly preferred are polyalkylene terephthalates which have been produced solely from terephthalic acid and its reactive derivatives (e.g. its dialkyl esters) and ethylene glycol and/or 1,4-butanediol and/or 1,4-cyclohexanedimethanol groups, and mixtures of these polyalkylene terephthalates.

Preferred polyalkylene terephthalates are also copolyesters which are produced from at least two of the aforementioned acid components and/or from at least two of the aforementioned alcohol components, and particularly preferred copolyesters are poly(ethylene glycol/1,4-butanediol) terephthalates.

The polyalkylene terephthalates preferably used as a component preferably possess an intrinsic viscosity of approx. 0.4 to 1.5 dl/g, preferably 0.5 to 1.3 dl/g, measured in phenol/o-dichlorobenzene (1:1 parts by weight) at 25° C. in each case.

In particularly preferred embodiments of the invention, the blend of at least one polycarbonate or copolycarbonate with at least one poly- or copolycondensate of terephthalic acid is a blend of at least one polycarbonate or copolycarbonate with poly- or copolybutylene terephthalate or glycol-modified poly- or copoly-cyclohexanedimethylene terephthalate. Such a blend of polycarbonate or copolycarbonate with poly- or copolybutylene terephthalate or glycol-modified poly- or copolycyclohexanedimethylene terephthalate can preferably be one with 1 to 90 wt. % polycarbonate or copolycarbonate and 99 to 10 wt. % poly- or copolybutylene terephthalate or glycol-modified poly- or copolycyclohexanedimethylene terephthalate, preferably with 1 to 90 wt. % polycarbonate and 99 to 10 wt. % polybutylene terephthalate or glycol-modified polycyclohexanedimethylene terephthalate, the proportions adding up to 100 wt. %. Particularly preferably, such a blend of polycarbonate or copolycarbonate with poly- or copolybutylene terephthalate or glycol-modified poly- or copolycyclohexanedimethylene terephthalate can be one with 20 to 85 wt. % polycarbonate or copolycarbonate and 80 to 15 wt. % poly- or copolybutylene terephthalate or glycol-modified poly- or copolycyclohexanedimethylene terephthalate, preferably with 20 to 85 wt. % polycarbonate and 80 to 15 wt. % polybutylene terephthalate or glycol-modified polycyclohexanedimethylene terephthalate, the proportions adding up to 100 wt. %. Most particularly preferably, such a blend of polycarbonate or copolycarbonate with poly- or copolybutylene terephthalate or glycol-modified poly- or copolycyclohexanedimethylene terephthalate can be one with 35 to 80 wt. % polycarbonate or copolycarbonate and 65 to 20 wt. % poly- or copolybutylene terephthalate or glycol-modified poly- or copolycyclohexanedimethylene terephthalate, preferably with 35 to 80 wt. % polycarbonate and 65 to 20 wt. % polybutylene terephthalate or glycol-modified polycyclohexanedimethylene terephthalate, the proportions adding up to 100 wt. %. In most particularly preferred embodiments, they can be blends of polycarbonate and glycol-modified polycyclohexanedimethylene terephthalate in the compositions mentioned above.

Suitable as polycarbonates or copolycarbonates in preferred embodiments are in particular aromatic polycarbonates or copolycarbonates.

The polycarbonates or copolycarbonates can be linear or branched in a known manner.

The production of these polycarbonates can take place in a known manner from diphenols, carbonic acid derivatives, optionally chain terminators and optionally branching agents. Details of the production of polycarbonates have been laid down in many patent specifications for about 40 years. Reference will be made here, by way of example, only to Schnell, "Chemistry and Physics of Polycarbonates", Polymer Reviews, volume 9, Interscience Publishers, New York, London, Sydney 1964, to D. Freitag, U. Grigo, P. R. Müller, H. Nouvertne', BAYER AG, "Polycarbonates" in Encyclopedia of Polymer Science and Engineering, volume 11, Second Edition, 1988, pages 648-718 and finally to Drs. U. Grigo, K. Kirchner and P. R. Müller "Polycarbonate" in Becker/Braun, Kunststoff-Handbuch, volume 3/1, Polycarbonate, Polyacetale, Polyester, Celluloseester, Carl Hanser Verlag Munich, Vienna 1992, pages 117-299.

Suitable diphenols can be, for example, dihydroxyaryl compounds of the general formula (I),

HO—Z—OH (I)

wherein Z is an aromatic group with 6 to 34 C atoms, which can contain one or more optionally substituted aromatic rings and aliphatic or cycloaliphatic groups or alkyl aryls or hetero atoms as bridge links.

Examples of suitable dihydroxyaryl compounds are: dihydroxybenzenes, dihydroxydiphenyls, bis(hydroxyphenyl)alkanes, bis(hydroxyphenyl)cycloalkanes, bis(hydroxyphenyl) aryls, bis(hydroxyphenyl)ethers, bis(hydroxyphenyl) ketones, bis(hydroxyphenyl) sulfides, bis(hydroxyphenyl) sulfones, bis(hydroxyphenyl) sulfoxides, 1,1'-bis(hydroxyphenyl)diisopropylbenzenes and the ring-alkylated and ring-halogenated compounds thereof.

These and additional suitable other dihydroxyaryl compounds are described e.g. in DE-A 3 832 396, FR-A 1 561 518, in H. Schnell, Chemistry and Physics of Polycarbonates, Interscience Publishers, New York 1964, p. 28 ff.; p. 102 ff. and in D. G Legrand, J. T. Bendler, Handbook of Polycarbonate Science and Technology, Marcel Dekker New York 2000, p. 72 ff.

Preferred dihydroxyaryl compounds are e.g. resorcinol, 4,4'-dihydroxydiphenyl, bis(4-hydroxyphenyl)methane, bis (3,5-dimethyl-4-hydroxyphenyl)methane, bis(4-hydroxyphenyl)diphenylmethane, 1,1-bis(4-hydroxyphenyl)-1-phenylethane, 1,1-bis(4-hydroxyphenyl)-1-(1-naphthyl)ethane, 1,1-bis(4-hydroxyphenyl)-1-(2-naphthyl)ethane, 2,2-bis(4-hydroxyphenyl)propane, 2,2-bis(3-methyl-4-hydroxyphenyl)propane, 2,2-bis(3,5-dimethyl-4-hydroxyphenyl)propane, 2,2-bis(4-hydroxyphenyl)-1-phenyl-propane, 2,2-bis (4-hydroxyphenyl)hexafluoropropane, 2,4-bis(4-hydroxyphenyl)-2-methylbutane, 2,4-bis(3,5-dimethyl-4-hydroxyphenyl)-2-methylbutane, 1,1-bis(4-hydroxyphenyl) cyclohexane, 1,1-bis(3,5-dimethyl-4-hydroxyphenyl) cyclohexane, 1,1-bis(4-hydroxyphenyl)-4-methylcyclohexane, 1,3-bis[2-(4-hydroxyphenyl)-2-propyl] benzene, 1,1'-bis(4-hydroxyphenyl)-3-diisopropylbenzene, 1,1'-bis(4-hydroxyphenyl)-4-diisopropylbenzene, 1,3-bis[2-(3,5-dimethyl-4-hydroxyphenyl)-2-propyl]benzene, bis(4-hydroxyphenyl)ether, bis(4-hydroxyphenyl) sulfide, bis(4-hydroxyphenyl) sulfone, bis(3,5-dimethyl-4-hydroxyphenyl) sulfone and 2,2',3,3'-tetrahydro-3,3,3',3'-tetramethyl-1,1'-spirobi-[1H-indene]-5,5'-diol or dihydroxydiphenyl cycloalkanes of formula (Ia)

(Ia)

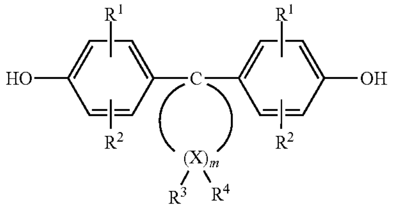

wherein $R^1$ and $R^2$ independently of one another signify hydrogen, halogen, preferably chlorine or bromine, $C_1$-$C_8$ alkyl, $C_5$-$C_6$ cycloalkyl, $C_6$-$C_{10}$ aryl, preferably phenyl, and $C_7$-$C_{12}$ aralkyl, preferably phenyl-$C_1$-$C_4$-alkyl, particularly benzyl, m signifies an integer from 4 to 7, preferably 4 or 5, $R^3$ and $R^4$ can be selected for each X individually and, independently of one another, signify hydrogen or $C_1$-$C_6$ alkyl and X signifies carbon, with the proviso that on at least one X atom, $R^3$ and $R^4$ simultaneously signify alkyl. Preferably in formula (Ia), on one or two X atom(s), particularly only on one X atom, $R^3$ and $R^4$ simultaneously signify alkyl.

The preferred alkyl group for the groups $R^3$ and $R^4$ in formula (Ia) is methyl. The X atoms in alpha position to the diphenyl-substituted C atom (C-1) are preferably not dialkyl-substituted; on the other hand, the alkyl disubstitution in beta position to C-1 is preferred.

Particularly preferred dihydroxydiphenylcycloalkanes of the formulae (Ia) are those with 5 and 6 ring C atoms X in the cycloaliphatic group (m=4 or 5 in formula (Ia)), for example the diphenols of formulae (Ia-1) to (Ia-3d), (Ia-1)

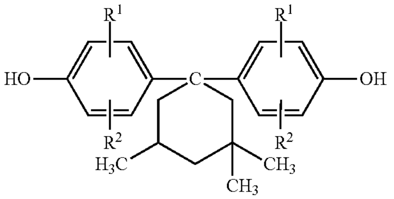

(Ia-2)

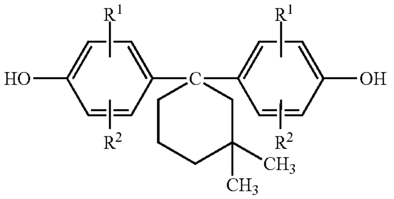

(Ia-3)

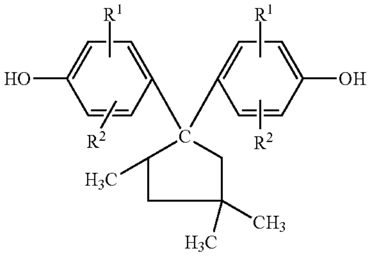

A most particularly preferred dihydroxydiphenyl cycloalkane of the formula (Ia) is 1,1-bis(4-hydroxyphenyl)-3,3,5-trimethylcyclohexane (formula (Ia-1) with $R^1$ and $R^2$ equal to H).

Such polycarbonates can be produced from dihydroxydiphenyl cycloalkanes of formula (Ia) according to EP-A 359 953.

Particularly preferred dihydroxyaryl compounds are resorcinol, 4,4'-dihydroxydiphenyl, bis(4-hydroxyphenyl)diphenylmethane, 1,1-bis(4-hydroxyphenyl)-1-phenylethane, bis (4-hydroxyphenyl)-1-(1-naphthyl)ethane, bis(4-hydroxyphenyl)-1-(2-naphthyl)-ethane, 2,2-bis(4-hydroxyphenyl)propane, 2,2-bis(3,5-dimethyl-4-hydroxyphenyl)-propane, 1,1-bis(4-hydroxyphenyl) cyclohexane, 1,1-bis(3,5-dimethyl-4-hydroxy-phenyl) cyclohexane, 1,1-bis(4-hydroxyphenyl)-3,3,5-trimethylcyclohexane, 1,1'-bis(4-hydroxyphenyl)-3-diisopropylbenzene and 1,1'-bis(4-hydroxyphenyl)-4-diisopropyl-benzene.

Most particularly preferred dihydroxyaryl compounds are 4,4'-dihydroxydiphenyl and 2,2-bis(4-hydroxyphenyl)propane.

It is possible to use either one dihydroxyaryl compound, with the formation of homopolycarbonates, or various dihydroxyaryl compounds, with the formation of copolycarbonates. It is possible to use either one dihydroxyaryl compound of formula (I) or (Ia), with the formation of homopolycarbonates, or several dihydroxyaryl compounds of formula (I) and/or (Ia), with the formation of copolycarbonates. In this case the various dihydroxyaryl compounds can be linked together either randomly or in blocks. In the case of copolycarbonates of dihydroxyaryl compounds of formulae (I) and (Ia), the molar ratio of dihydroxyaryl compounds of formula (Ia) to the other dihydroxyaryl compounds of formula (I) that may optionally also be used is preferably between 99 mole % (Ia) to 1 mole % (I) and 2 mole % (Ia) to 98 mole % (I), preferably between 99 mole % (Ia) to 1 mole % (I) and 10 mole % (Ia) to 90 mole % (I) and particularly between 99 mole % (Ia) to 1 mole % (I) and 30 mole % (Ia) to 70 mole %

A most particularly preferred copolycarbonate can be produced using 1,1-bis(4-hydroxyphenyl)-3,3,5-trimethylcyclohexane and 2,2-bis(4-hydroxyphenyl)propane di-hydroxyaryl compounds of formulae (Ia) and (I).

Suitable carbonic acid derivatives can be, for example, diaryl carbonates of the general formula (II),

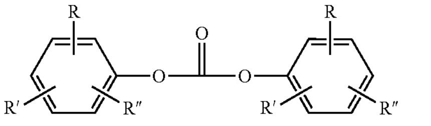

(II)

wherein

R, R' and R" independently of one another are the same or different and denote hydrogen, linear or branched $C_1$-$C_{34}$ alkyl, $C_7$-$C_{34}$ alkylaryl or $C_6$-$C_{34}$ aryl, R in addition can also signify —COO—R''', wherein R''' denotes hydrogen, linear or branched $C_1$-$C_{34}$ alkyl, $C_7$-$C_{34}$ alkylaryl or $C_6$-$C_{34}$ aryl.

Preferred diaryl carbonates are, for example, diphenyl carbonate, methylphenyl phenyl carbonates and di(methylphenyl) carbonates, 4-ethylphenyl phenyl carbonate, di(4-ethylphenyl) carbonate, 4-n-propylphenyl phenyl carbonate, di(4-n-propylphenyl) carbonate, 4-isopropylphenyl phenyl carbonate, di(4-isopropylphenyl) carbonate, 4-n-butylphenyl phenyl carbonate, di(4-n-butylphenyl) carbonate, 4-isobutylphenyl phenyl carbonate, di(4-isobutylphenyl) carbonate, 4-tert.-butylphenyl phenyl carbonate, di(4-tert.-butylphenyl) carbonate, 4-n-pentylphenyl phenyl carbonate, di(4-n-pentylphenyl) carbonate, 4-n-hexylphenyl phenyl carbonate, di(4-n-hexylphenyl) carbonate, 4-isooctylphenyl phenyl carbonate, di(4-isooctylphenyl) carbonate, 4-n-nonylphenyl phenyl carbonate, di-(4-n-nonylphenyl) carbonate, 4-cyclohexylphenyl phenyl carbonate, di(4-cyclohexylphenyl) carbonate, 4-(1-methyl-1-phenylethyl)phenyl phenyl carbonate, di[4-(1-methyl-1-phenylethyl)phenyl]carbonate, biphenyl-4-yl phenyl carbonate, di(biphenyl-4-yl) carbonate, 4-(1-naphthyl)phenyl phenyl carbonate, 4-(2-naphthyl)phenyl phenyl carbonate, di[4-(1-naphthyl)phenyl]carbonate, di[4-(2-naphthyl)phenyl]carbonate, 4-phenoxyphenyl phenyl carbonate, di(4-phenoxyphenyl) carbonate, 3-pentadecylphenyl phenyl carbonate, di(3-pentadecylphenyl) carbonate, 4-tritylphenyl phenyl carbonate, di(4-tritylphenyl) carbonate, methyl salicylate phenyl carbonate, di(methyl salicylate) carbonate, ethyl salicylate phenyl carbonate, di(ethyl salicylate) carbonate, n-propyl salicylate phenyl carbonate, di(n-propyl salicylate) carbonate, isopropyl salicylate phenyl carbonate, di(isopropyl salicylate) carbonate, n-butyl salicylate phenyl carbonate, di(n-butyl salicylate) carbonate, isobutyl salicylate phenyl carbonate, di(isobutyl salicylate) carbonate, tert.-butyl salicylate phenyl carbonate, di(tert.-butyl salicylate) carbonate, di(phenyl salicylate) carbonate and di(benzyl salicylate) carbonate.

Particularly preferred diaryl compounds are diphenyl carbonate, 4-tert-butylphenyl phenyl carbonate, di(4-tert-butylphenyl) carbonate, biphenyl-4-yl phenyl carbonate, di(biphenyl-4-yl) carbonate, 4-(1-methyl-1-phenylethyl)phenyl phenyl carbonate, di-[4-(1-methyl-1-phenylethyl)phenyl] carbonate and di(methyl salicylate) carbonate.

Most particularly preferred is diphenyl carbonate.

It is possible to use either one diaryl carbonate or various diaryl carbonates.

To control or modify the end groups, it is additionally possible to employ as chain terminators for example one or more monohydroxyaryl compound(s), which was/were not used for the production of the diaryl carbonate(s) used. These can be compounds of the general formula (III)

(III)

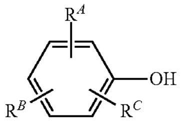

wherein $R^A$ denotes linear or branched $C_1$-$C_{34}$ alkyl, $C_7$-$C_{34}$ alkylaryl, $C_6$-$C_{34}$ aryl or —COO—$R^D$, wherein $R^D$ denotes hydrogen, linear or branched $C_1$-$C_{34}$ alkyl, $C_7$-$C_{34}$ alkylaryl or $C_6$-$C_{34}$ aryl, and $R^B$, $R^C$ independently of one another are the same or different and denote hydrogen, linear or branched $C_1$-$C_{34}$ alkyl, $C_7$-$C_{34}$ alkylaryl or $C_6$-$C_{34}$ aryl.

Monohydroxyaryl compounds of this type are, for example, 1-, 2- or 3-methylphenol, 2,4-dimethylphenol, 4-ethylphenol, 4-n-propylphenol, 4-isopropylphenol, 4-n-butylphenol, 4-isobutylphenol, 4-tert.-butylphenol, 4-n-pentylphenol, 4-n-hexylphenol, 4-isooctylphenol, 4-n-nonylphenol, 3-pentadecylphenol, 4-cyclohexylphenol, 4-(1-methyl-1-phenylethyl)phenol, 4-phenylphenol, 4-phenoxyphenol, 4-(1-naphthyl)phenol, 4-(2-naphthyl)phenol, 4-tritylphenol, methyl salicylate, ethyl salicylate, n-propyl salicylate, isopropyl salicylate, n-butyl salicylate, isobutyl salicylate, tert.-butyl salicylate, phenyl salicylate and benzyl salicylate.

4-tert-Butylphenol, 4-isooctylphenol and 3-pentadecylphenol are preferred.

Suitable branching agents can be compounds with three and more functional groups, preferably those with three or more hydroxyl groups.

Suitable compounds with three or more phenolic hydroxyl groups are e.g. phloroglucinol, 4,6-dimethyl-2,4-6-tri(4-hydroxyphenyl)-heptene-2,4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl) phenylmethane, 2,2-bis(4,4-bis(4-hydroxyphenyl) cyclohexyl]propane, 2,4-bis(4-hydroxyphenylisopropyl) phenol and tetra(4-hydroxyphenyl)methane.

Other suitable compounds with three and more functional groups are e.g. 2,4-dihydroxybenzoic acid, trimesic acid (trichloride), cyanuric acid trichloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-di-hydroindole and 1,1,1-tri(4-hydroxyphenyl)ethane.

The outer layer which reflects or absorbs IR radiation preferably has a transmission for radiation in the wavelength of from 800 to 1200 nm, preferably from 850 to 1100 nm, of no more than 20%, preferably no more than 15%, particularly preferably no more than 10%. The outer layer which reflects or absorbs IR radiation preferably also has a transmission for radiation in the wavelength of from 400 to 700 nm of more than 60%, preferably more than 70%. The transmission is determined in accordance with ASTM D 1003.

The outer layer which reflects or absorbs IR radiation can preferably contain at least one IR-absorbing additive. Organic IR-absorbing additives can preferably be considered here. Suitable organic IR-absorbing additives are compounds that exhibit the highest possible absorption between 700 and 1500 nm (near infrared=NIR).

Suitable examples are infrared absorbers known from the literature, as described according to classes of substances e.g. in M. Matsuoka, Infrared Absorbing Dyes, Plenum Press, New York, 1990. Particularly suitable are infrared absorbers from the classes of substances of the azo, azomethine, methine, anthraquinone, indanthrone, pyranthrone, flavanthrone, benzanthrone, phthalocyanine, perylene, dioxazine, thioindigo isoindoline, isoindolinone, quinacridone, pyrrolopyrrole or quinophthalone pigments and metal complexes of azo, azomethine or methine dyes or metal salts of azo compounds. Of these, phthalocyanines and naphthalocyanines are most particularly suitable. Owing to their improved solubility in thermoplastic polymers, phthalocyanines and naphthalocyanines with bulky side groups are to be preferred.

With regard to the quantity of the IR-absorbing additives contained in the outer layer which reflects or absorbs IR radiation, there are no special restrictions provided that the desired absorption of IR radiation and adequate transparency are guaranteed. It has proved particularly advantageous if the composition of the outer layer which reflects or absorbs IR radiation contains the IR-absorbing additive(s) in a quantity of from 0.0001 to 10 wt. %, particularly from 0.001 to 0.05 wt. %, based on the total weight of the composition of the outer layer which reflects or absorbs IR radiation. Mixtures of IR-absorbing additives are also particularly suitable. The person skilled in the art can achieve optimisation of the absorption in the near infrared range with dyes of different wavelengths of the absorption maxima.

Such sheets or films which reflect or absorb IR radiation are known and commercially available.

The outer layer which reflects or absorbs IR radiation can also preferably be a multi-layer structure, most particularly preferably a multi-layer optical interference film, which can be produced preferably by coextrusion of alternating polymer layers. These are preferably layers based on coextruded films which reflect IR radiation having a narrow reflection range as a result of light interference.

These multi-layer films are preferably built up from several parallel layers of transparent thermoplastic polymers, for which the above-mentioned thermoplastic polymers are suitable, with directly adjacent layers consisting in each case of different thermoplastic polymers, the refractive indices of which differ from one another by at least 0.03, particularly preferably by at least 0.06. A multi-layer film of this type preferably contains at least 10 layers.

The individual layers of the multi-layer film are preferably very thin with layer thicknesses in the range of about 30 to 500 nm, preferably approximately 50 to 400 nm, which results in a reinforcement interference of light waves reflected at the many interfaces. Depending on the layer thickness and the refractive index of the thermoplastic polymers, a dominant wavelength band is reflected while the remaining light is transmitted by the film.

The amount of reflected light (reflectivity) depends on the difference between the two refractive indices, the ratio of the optical thicknesses of the layers, the number of layers and the uniformity of the layer thicknesses.

Multi-layer films of this type are known to the person skilled in the art and described e.g. in U.S. Pat. No. 3,610,729, U.S. Pat. No. 3,711,176, U.S. Pat. No. 4,446,305, U.S. Pat. No. 4,540,623, U.S. Pat. No. 5,448,404, U.S. Pat. No. 5,882,774, U.S. Pat. No. 6,531,230, U.S. Pat. No. 6,783,349, WO-A 99/39224 and WO-A 03/100521.

The laminar structure according to the invention preferably has at least one layer containing at least one thermoplastic polymer and at least one filler ("filled layer"). The thermoplastic polymers mentioned above are suitable as thermoplastic polymers for this purpose.

The filler in the filled layers is preferably at least one coloured pigment and/or at least one other filler to produce a translucency of the filled layers, preferably titanium dioxide, zirconium dioxide, barium sulfate or glass fibres, particularly preferably titanium dioxide.

The filled layers and the filled films used to produce them are preferably those with a transmission in the visible wavelength range of 380 nm to 780 nm of less than 50%, preferably of less than 35%, particularly preferably of less than 25% and in most particularly preferred embodiments of less than 15%.

The aforementioned fillers are preferably added to the thermoplastic polymers in quantities of from 2 to 45 wt. %, particularly preferably from 5 to 30 wt. %, based on the total weight of filler and thermoplastic polymer, before they are shaped into the plastics film, which can take place e.g. by extrusion or coextrusion.

The filled layers can contain other information in preferred embodiments of the invention. This other information can be applied e.g. by means of conventional printing techniques, such as e.g. inkjet, offset or laser printing.

The laminar structure according to the invention can contain other additional layers, by means of which for example other information can be introduced into the security document, preferably identification document.

This other information can be, for example, personalising portraits or non-personalising general information, which is contained in the same form for example in any security document, preferably identification document, of the same type.

These layers can be introduced into the laminar structure according to the invention for example from films previously provided with this information by means of conventional printing methods, preferably inkjet or laser printing, particularly preferably colour printing.

Films capable of being printed by inkjet printing methods are known to the person skilled in the art and can be for example those made of at least one of the thermoplastic polymers described above, optionally containing at least one of the fillers described above. In particularly preferred embodiments, for better visibility of the printed information, plastics films coloured white or translucent using fillers such as e.g. titanium dioxide, zirconium dioxide, barium sulfate etc. are used.

For films to be printed by laser printing, particularly by colour laser printing, those plastics films made of one of the above-mentioned thermoplastic polymers having a surface resistivity of $10^7$ to $10^{13}\Omega$, preferably of $10^8$ to $10^{12}\Omega$, are particularly suitable. The surface resistivity in Ω is determined in accordance with DIN IEC 93.

These can preferably be those films in which for example an additive selected from tertiary or quaternary, preferably quaternary ammonium or phosphonium salts of a partially fluorinated or perfluorinated organic acid or quaternary ammonium or phosphonium hexafluorophosphates, preferably a partially fluorinated or perfluorinated alkylsulfonic acid, preferably a perfluoroalkylsulfonic acid, has been added to the thermoplastic polymer to achieve the surface resistivity.

Preferred suitable quaternary ammonium or phosphonium salts are:

perfluorooctanesulfonic acid tetrapropylammonium salt
perfluorobutanesulfonic acid tetrapropylammonium salt
perfluorooctanesulfonic acid tetrabutylammonium salt
perfluorobutanesulfonic acid tetrabutylammonium salt
perfluorooctanesulfonic acid tetrapentylammonium salt
perfluorobutanesulfonic acid tetrapentylammonium salt
perfluorooctanesulfonic acid tetrahexylammonium salt
perfluorobutanesulfonic acid tetrahexylammonium salt
perfluorobutanesulfonic acid trimethylneopentylammonium salt
perfluorooctanesulfonic acid trimethylneopentylammonium salt
perfluorobutanesulfonic acid dimethyldineopentylammonium salt
perfluorooctanesulfonic acid dimethyldineopentylammonium salt
N-methyltripropylammonium perfluorobutyl sulfonate
N-ethyltripropylammonium perfluorobutyl sulfonate
tetrapropylammonium perfluorobutyl sulfonate
diisopropyldimethylammonium perfluorobutyl sulfonate
diisopropyldimethylammonium perfluorooctyl sulfonate
N-methyltributylammonium perfluorooctyl sulfonate
cyclohexyldiethylmethylammonium perfluorooctyl sulfonate
cyclohexyltrimethylammonium perfluorooctyl sulfonate, and the corresponding phosphonium salts. The ammonium salts are preferred.

One or more of the above-mentioned quaternary ammonium or phosphonium salts, i.e. mixtures, can preferably also be used.

Most particularly suitable is the perfluorooctanesulfonic acid tetrapropylammonium salt, the perfluorooctanesulfonic acid tetrabutylammonium salt, the perfluorooctanesulfonic acid tetrapentylammonium salt, the perfluorooctanesulfonic acid tetrahexylammonium salt and the perfluorooctanesulfonic acid dimethyl-diisopropylammonium salt and the corresponding perfluorobutanesulfonic acid salts.

In a most particularly preferred embodiment, perfluorobutanesulfonic acid dimethyl-diisopropylammonium salt (diisopropyldimethylammonium perfluorobutyl sulfonate) can be used as additive.

The aforementioned salts are known or can be produced by known methods. The salts of sulfonic acids can be prepared e.g. by adding together equimolar quantities of the free sulfonic acid with the hydroxy form of the corresponding cation in water at room temperature and concentrating the solution. Other production processes are described e.g. in DE-A 1 966 931 and NL-A 7 802 830.

The aforementioned salts are preferably added to the thermoplastic polymers in quantities of from 0.001 to 2 wt. %, preferably from 0.1 to 1 wt. %, before they are shaped into the plastics film, which can take place e.g. by extrusion or coextrusion.

The laminar structure according to the invention can also contain other additional layers, which contain UV protection and/or protection from mechanical damage—such as e.g. scratch-resistant coatings—etc.

The laminar structure according to the invention can be produced for example in that

- films corresponding to the individual layers, with the exception of the outer layer which reflects or absorbs IR radiation, are placed together in a film stack and laminated to form a layered composite,
- the data or information to be applied on to the laminated layered composite by means of laser engraving, preferably personalising data or information, is then introduced into the layered composite by laser marking and
- the outer layer which reflects or absorbs IR radiation is then applied by means of bonding and/or laminating.

The laminar structure according to the invention is preferably suitable for increasing the anti-forgery security of security documents, particularly preferably identification documents. The laminar structure according to the invention is most particularly preferably suitable for increasing the anti-forgery security of those identification documents that take the form of bonded or laminated layered composites in the form of plastic cards, such as e.g. identity cards, passports, driving licenses, credit cards, bank cards, cards for access control or other identity documents etc. Preferred identification documents within the framework of the present invention are multi-layer, flat documents with safety features such as chips, photographs, biometric data etc. These security features may be visible or at least queryable externally. An identification document of this type preferably has a size between that of a cheque card and that of a passport. An identification document of this type can also be part of a multi-part document, such as e.g. an identification document made of plastic in a passport which also contains paper or cardboard portions.

The present invention thus also provides a security document, preferably an identification document, containing at least one laser-marked laminar structure according to the invention.

The outer layer which reflects or absorbs IR radiation is applied over the whole or part of the surface on to the laminar structure, preferably the security document or identification document, after this has been personalised by means of laser engraving in order to prevent subsequent alteration of the personalising data applied by laser engraving and thus to increase the anti-forgery security.

The invention therefore also provides a method of blocking the laser markability of laser-marked laminar structures, characterised in that a laser-marked laminar structure containing at least one thermoplastic polymer layer equipped to be laser-markable is provided, after laser marking, with an outer layer over the whole or part of the surface, which reflects or absorbs IR radiation.

Within the framework of the invention, blocking the laser markability means both a significant reduction of further laser markability and the complete prevention of further laser markability.

The outer layer which reflects or absorbs IR radiation is preferably applied on to the laser-marked laminar structure after laser marking, in the form of a film, preferably in the form of a multi-layer film, particularly preferably in the form of a multi-layer optical interference film.

This application can take place using an adhesive and/or by means of lamination, in which case application by lamination can take place both with support by an adhesive and with a complete lack of adhesive.

In the case of application using an adhesive, the use of a latent-reactive adhesive is most particularly preferred.

Latent-reactive adhesives are known to the person skilled in the art. Preferred latent-reactive adhesives are those involving an aqueous dispersion, which contain a di- or polyisocyanate with a melting or softening point of >30° C. and an isocyanate-reactive polymer. An aqueous dispersion of this type preferably has a viscosity of at least 2000 mPas. It is also preferred for the isocyanate-reactive polymer in this dispersion to be a polyurethane that is built up from crystallising polymer chains which decrystallise partly or completely at temperatures below +110° C., preferably at temperatures below +90° C., as measured by thermomechanical analysis (TMA). The measurement by TMA is performed similarly to ISO 11359 part 3 "Determination of the penetration temperature". It is also preferred for the di- or polyisocyanate to be one selected from the group consisting of dimerisation products, trimerisation products and urea derivatives of TDI (toluene diisocyanate) or IPDI (isophorone diisocyanate). Latent-reactive adhesives of this type are described e.g. in DE-A 10 2007 054 046.

Through the use of these latent-reactive adhesives, an additional increase in the anti-forgery security can be achieved in that it is no longer possible for water vapour and/or air to diffuse through the edges of the laminar structure into the interior and this can therefore no longer lead to subsequent delamination. These laminar structures can no longer be separated without being destroyed. Accordingly, the outer layer which reflects or absorbs IR radiation can no longer be separated off without destroying the entire security document or identification document. Moreover, the same also applies to an outer layer which reflects or absorbs IR radiation applied by means of lamination.

The use of a film which reflects or absorbs IR radiation to block the laser markability of laser-marked laminar structures, preferably of security documents, particularly preferably of identification documents, has not previously been known and is therefore also provided by the present invention.

The following examples serve to explain the invention by way of examples, and are not to be interpreted as a restriction.

EXAMPLES

Films Used for the Laminated Card Structure According to the Invention

Film 1-1: White Filled Film

A polycarbonate film having a thickness of 100 μm based on Makrolon 3108® polycarbonate from Bayer MaterialScience AG and titanium dioxide (Kronor® 2230 from Kronos Titan) as white pigment filler with a composition of 85 wt. % Makrolon 3108® and 15 wt. % titanium dioxide was produced by extrusion with a melt temperature of approx. 280° C.

Film 1-2: White Filled Film

A film with the same composition as film 1-1 was produced with a thickness of 400 μm.

Film 2: Laser-Engravable Film

A polycarbonate film having a thickness of 50 μm based on Makrolon 3108® polycarbonate from Bayer MaterialScience AG and carbon black (Flamruβ 101 from Degussa) having an average particle size of 95 nm as laser-sensitive additive was produced by extrusion with a melt temperature of approx. 280° C. For this purpose, a compound of 85 wt. % Makrolon 3108® polycarbonate and 15 wt. % of a masterbatch with a composition of 99.004 wt. % Makrolon 3108® and 0.006 wt. % (60 ppm) carbon black was used.

Film 3: Transparent Film

A polycarbonate film having a thickness of 50 μm based on Makrolon 3108® polycarbonate from Bayer MaterialScience AG was produced by extrusion with a melt temperature of approx. 280° C.

Film 4: Ir-Reflective Film:

A commercially available IR-reflective film from 3M (3M Vikuiti® Clear Card IR Filter) was used. This was a transparent, IR-reflective film with less than 20% light transmission in the range between 850 and 1100 nm (determined in accordance with ASTM D 1003).

Example 1

Production of a Laser-Writable Laminar Structure

From the films listed above, a laser-writable laminar structure was laminated as listed below in the form of an ID card:

(1) Film 3; 50 μm
(2) Film 2; 50 μm
(3) Film 1-1; 100 μm
(4) Film 1-2; 400 μm
(5) Film 1-1; 100 μm
(6) Film 2; 50 μm
(7) Film 3; 50 μm A symmetrical laminar structure of the card was selected to avoid bending of the card.

For this purpose, a stack of the films was formed in the order mentioned above and the lamination was carried out on a Bürkle laminating press with the following parameters:

pre-heating the press to 170-180° C.
pressing for 8 minutes at a pressure of 15 $N/cm^2$
pressing for 2 minutes at a pressure of 200 $N/cm^2$
cooling the press to 38° C. and opening the press.

Example 2

Production of an Adhesive Coating on the IR-Reflective Film for Subsequent Lamination on to this ID Card Film 4 mentioned above was used as the IR-reflective film.

To produce the adhesive dispersion for the adhesive coating, the following components were used:

A) Polyurethane Dispersion:

Polyurethane dispersion with a solids content of approx. 45 wt. %; isocyanate-reactive polymer of linear polyurethane chains in water B) Thickener: Borchi® Gel L 75 N Non-ionic, liquid, aliphatic, polyurethane-based thickener: viscosity at 23° C.:>9000 mPas; non-volatile components: 50 wt. %.

C) Deactivated polyisocyanate: Dispercoll® BL XP 2514

Suspension of surface-deactivated TDI-uretdione (TDI dimer) in water with a solids content of approx. 40 wt. %.

For the production of the adhesive dispersion, 7 parts by weight of the thickener B) were first added to 700 parts by weight of the polyurethane dispersion A) while stirring, to increase the viscosity.

Next, 10 parts by weight of the deactivated polyisocyanate C) were added to 100 parts by weight of this thickened dispersion while stirring, so that an aqueous dispersion was obtained.

Next, the IR-reflective film was coated with this adhesive dispersion using a wire-wound coating rod, the wet film thickness of the adhesive dispersion being 100 μm, so that a dry film thickness of approx. 30 μm was obtained. Next, the coated film was dried for 90 minutes at approx. 35° C. in a drying cabinet and was then ready for use in the lamination.

Example 3

The left-hand half of the layer (1) of the ID card produced in example 1 was laminated in a second laminating step with the adhesive-coated IR-reflective film from example 2.

For this purpose, the lamination was carried out on a Biirkle laminating press with the following parameters:

pre-heating the press to 90° C.

pressing for 8 minutes at a pressure of 15 $N/cm^2$ cooling the press to 38° C. and opening the press.

Example 4

On the ID-card half-coated with the IR-reflective film from example 3, a laser engraving was carried out on a Foba laser machine with the following parameters:

Laser medium: Nd:YAG

Wavelength: 1064 nm

Power: 40 watt

Current: 30 A

Pulse frequency: 14 kHz

Feed rate: 200 mm/sec

During laser engraving, the information was written only on to a laser-writable film layer (layer (2)) of the ID card. As the information, the complete portrait of a woman was to be written into the laser-writable layer by means of laser engraving. The following result was achieved:

On the left-hand half of the ID card, on which the IR-reflective film was laminated, no laser engraving of the laser-writable film layer beneath it could be achieved. On the right-hand side, the right-hand half of the face could be written into the laser-writable film layer with high contrast, which proves the fundamental writability of the laser layer.

Thus, the structure according to the invention offers the possibility of preventing subsequent laser engraving after personalisation of an ID card by laser engraving has been completed by means of applying an outer layer which reflects or absorbs IR radiation.

The invention claimed is:

1. A laser-marked laminar structure, comprising:

at least one laser marked thermoplastic polymer layer; and an outer layer, applied over the whole or part of a surface of the at least one laser-marked thermoplastic polymer layer, which prevents subsequent alteration by laser engraving of the at least one laser-marked thermoplastic polymer layer, the outer layer is comprised of a layer with at least one IR-absorbing additive, wherein the at least one laser-marked thermoplastic polymer contains at least one laser-sensitive additive, and wherein the laser-sensitive additive is carbon black, and wherein the at least one IR-absorbing additive is selected from the group consisting of azo, azomethine, methine, anthraquinone, indanthrone, pyranthrone, flavanthrone, benzanthrone, phthalocyanine, perylene, dioxazine, thioindigo isoindoline, isoindolinone, quinacridone, pyrollo pyrrole or quinophthalone pigments and metal complexes of azo, azomethine or methine dyes, and metal salts of azo compounds, wherein the thermoplastic polymer of the at least one laser-marked thermoplastic polymer layer is at least one thermoplastic polymer selected from polymers of ethylenically unsaturated monomers and/or polycondensates of bifunctional reactive compounds, or wherein the thermoplastic polymer of the at least one laser-marked thermoplastic polymer layer is at least one thermoplastic polymer selected from polymers of one or more polycarbonate(s) or copolycarbonate(s) based on diphenols, poly- or copolyacrylate(s) and poly- or copolymethacrylate(s), polymer(s) or copolymer(s) with styrene, polyurethane(s), and polyolefin(s), poly- or copolycondensate(s) of terephthalic acid, poly- or copolycondensates of naphthalenedicarboxylic acid, poly- or copolycondensate(s) of at least one cycloalkyl dicarboxylic acid, polysulfones or mixtures of thereof, or wherein the thermoplastic polymer of the at least one laser-marked thermoplastic polymer layer is at least one thermoplastic polymer selected from polymers of one or more polycarbonate(s) or copolycarbonate(s) based on diphenols or blends containing at least one polycarbonate or copolycarbonate.

2. The laser-marked laminar structure according to claim 1, wherein the transmission of the outer layer, which reflects or absorbs IR radiation, for radiation in the wavelength of from 800 to 1200 nm is no more than 20%, and the transmission for radiation in the wavelength of from 400 to 700 nm is more than 60%.

3. The laser-marked laminar structure according to claim 2, wherein the transmission of the outer layer which reflects or absorbs IR radiation for radiation in the wavelength of from 800 to 1200 nm is no more than 15%.

4. The laser-marked laminar structure according to claim 2, wherein the transmission of the outer layer which reflects or absorbs IR radiation for radiation in the wavelength of from 800 to 1200 nm is no more than 10%.

5. The laser-marked laminar structure according to claim 2, wherein the transmission for radiation in the wavelength of from 400 to 700 nm is more than 70%.

6. The laser-marked laminar structure according to claim 1, wherein the transmission of the outer layer, which reflects or absorbs IR radiation, for radiation in the wavelength of from 850 to 1100 nm, is no more than 20%, and the transmission for radiation in the wavelength of from 400 to 700 nm is more than 60%.

7. The laser-marked laminar structure according to claim 6, wherein the transmission of the outer layer which reflects or absorbs IR radiation for radiation in the wavelength of from 850 to 1100 nm is no more than 15%.

8. The laser-marked laminar structure according to claim 6, wherein the transmission of the outer layer which reflects or absorbs IR radiation for radiation in the wavelength of from 850 to 1100 nm is no more than 10%.

9. The laser-marked laminar structure according to claim 6, wherein the transmission for radiation in the wavelength of from 400 to 700 nm is more than 70%.

10. A laser-marked laminar structure, comprising:

at least one laser marked thermoplastic polymer layer; and an outer layer, applied over the whole or part of a surface of the at least one laser-marked thermoplastic polymer layer, which prevents subsequent alteration by laser engraving of the at least one laser-marked thermoplastic polymer layer, the outer layer is comprised of a layer with a multilayer structure, wherein the at least one laser-marked thermoplastic polymer contains at least one laser-sensitive additive, and wherein the laser-sensitive additive is carbon black, and wherein the thermoplastic polymer of the at least one laser-marked thermoplastic polymer layer is at least one thermoplastic polymer selected from polymers of ethylenically unsaturated monomers and/or polycondensates of bifunctional reactive compounds, or wherein the thermoplastic polymer of the at least one laser-marked thermoplastic polymer layer is at least one thermoplastic polymer selected from polymers of one or more polycarbonate(s) or copolycarbonate(s) based on diphenols, poly- or copolyacrylate(s) and poly- or copolymethacrylate(s), polymer(s) or copolymer(s) with styrene, polyurethane(s), and polyolefin(s), poly- or copolycondensate(s) of terephthalic acid, poly- or copolycondensates of naphthalenedicarboxylic acid, poly- or copolycondensate(s) of at least one cycloalkyl dicarboxylic acid, polysulfones or mixtures of thereof, or wherein the thermoplastic polymer of the at least one laser-marked thermoplastic polymer layer is at least one thermoplastic polymer selected from polymers of one or more polycarbonate(s) or copolycarbonate(s) based on diphenols or blends containing at least one polycarbonate or copolycarbonate.

11. The laser-marked laminar structure according to claim 1, wherein the laminar structure has at least one layer containing at least one thermoplastic polymer and at least one filler ("filled layer").

12. The laminar structure marked by laser engraving according to claim 11, wherein the at least one filler is a coloured pigment or another filler to produce a translucency of the filled layer, preferably titanium dioxide, zirconium dioxide, barium sulfate or glass fibres.

13. A security document comprising at least one laser-marked laminar structure according to claim 1.

14. The laser-marked laminar structure according to claim 10, wherein the multi-layer structure-is a multi-layer optical interference film obtained by coextrusion.

15. The laser-marked laminar structure according to claim 10, wherein when the outer layer is comprised of a multi-layer structure, the multi-layer structure-is a multi-layer optical interference film.

* * * * *